May 5, 1959 E. H. GATZERT 2,885,479

TRUNK CIRCUIT

Filed May 5, 1955 5 Sheets-Sheet 1

INVENTOR.
ERNEST H. GATZERT
BY J. Warren Whitesel
ATTORNEY

May 5, 1959 E. H. GATZERT 2,885,479

TRUNK CIRCUIT

Filed May 5, 1955 5 Sheets-Sheet 2

May 5, 1959 E. H. GATZERT 2,885,479

TRUNK CIRCUIT

Filed May 5, 1955 5 Sheets-Sheet 3

May 5, 1959 E. H. GATZERT 2,885,479

TRUNK CIRCUIT

Filed May 5, 1955 5 Sheets-Sheet 4

May 5, 1959 E. H. GATZERT 2,885,479

TRUNK CIRCUIT

Filed May 5, 1955 5 Sheets-Sheet 5

United States Patent Office 2,885,479

Patented May 5, 1959

2,885,479

TRUNK CIRCUIT

Ernest H. Gatzert, Rochester, N.Y., assignor, by mesne assignments, to General Dynamics Corporation, a corporation of Delaware Application May 5, 1955, Serial No. 506,232

14 Claims. (Cl. 179—6.31)

This invention relates to automatic telephone systems, and more particularly to trunk circuits therefor.

In the art of automatic telephony, it is conventional to extend a call over a trunk line between two or more physically separated offices. Usually each trunk line is terminated at its ends by means of trunk circuits. These trunk circuits are designed to provide certain standard connecting and supervisory functions which are material to the proper establishment of a call.

One object of this invention is to provide a new and improved trunk circuit.

Another object of this invention is to provide a trunk circuit wherein all functions may be performed with fewer parts.

Still another object of this invention is to provide a trunk circuit wherein certain relays are combined and reused to perform dual functions.

These and other objects are accomplished by means of a trunk circuit wherein two, two-step relays are used to provide a plurality of functions. On a first step, one of the relays controls the transmission of answer supervision over the trunk line. On its second step, this same relay controls the transmission of paystation tone if the call originated at a paystation. The other of the two-step relays serves to extend answer supervision on outgoing calls and to control the first two-step relay on incoming calls.

It is thought that these features may be explained best by making reference to the accompanying drawings in which.

The drawings show the source of office potential by means of simple plus (+) and minus (−) signs. The positive terminal is described as "ground (+)" and the negative terminal as "(−) battery" since this connection is used most often in the typical telephone system. It should be understood that this or any other suitable system may be used.

*Brief description*

Figure 1:
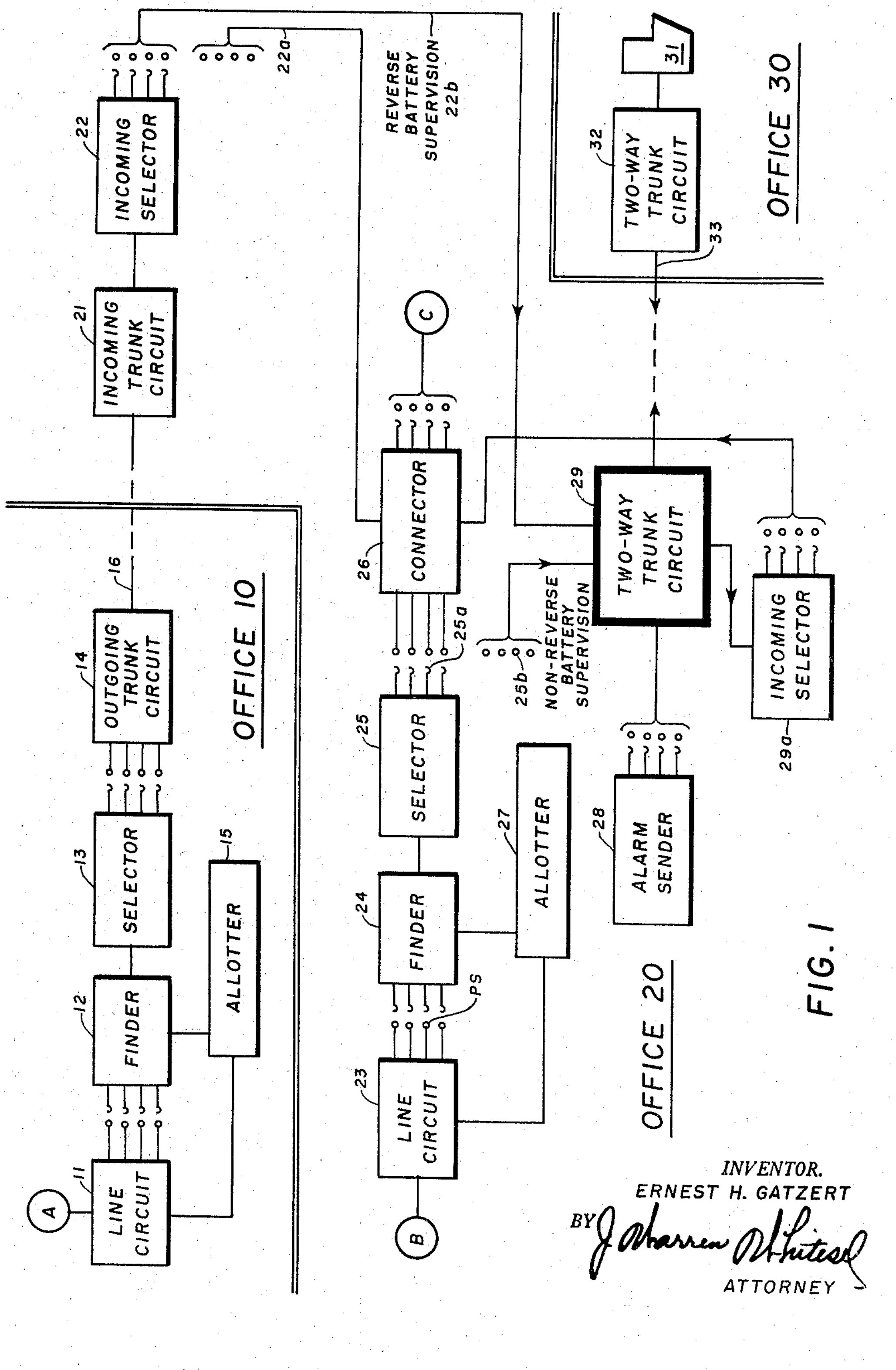
Fig. 1 shows a telephone system utilizing the invention (included in the rectangle set forth in heavily inked lines)

Fig. 1 shows briefly by block diagram form a telephone system including three offices and means for extending calls within and between them. Office 10 includes a subscriber line A which may be extended over a typical automatic switch train including line circuit 11, finder 12 and selector 13 operated under the influence of allotter 15, and outgoing trunk circuit 14 which is connected by way of trunk line 16 to a second office 20. The trunk line is terminated by incoming trunk circuit 21 which has access to incoming selector 22. From this point, incoming selector 22 may be directed either to seize over conductors **22*a* a local switch, such as connector 26, for example, or to seize over conductors 22*b* a two-way trunk circuit, such as trunk circuit 29, for example, to complete a call to distant office 30 via trunk line 33. In the second case, office 20 is used as a tandem office and two-way trunk circuit 29 is required to return reverse battery supervision to incoming selector 22**.

Also, a call may be extended from subscriber B in office 20 to subscriber C in office 20 over a standard switch train including line circuit 23, finder 24, selector 25 and connector 26. On the other hand, if selector 25 is directed to a set of terminals including contacts **25*b*, a circuit is completed to two-way trunk circuit 29 from which the call may be extended to office 30. In this case, trunk circuit 29 is arranged not to return reverse battery supervision to selector 25** since it is not necessary.

Still another type of outgoing call from trunk circuit 29 is initiated by an emergency or alarm condition. That is, alarm sender 28 operates to seize the trunk circuit responsive to trouble in office 20. In this case a signal is returned from trunk circuit 29 to alarm sender 28 responsive to answer supervision from office 30. Following this the alarm sender forwards proper signals which are indicative of the trouble that has occurred.

Incoming calls are extended from office 30 over trunk 33 to two-way trunk circuit 29. Suitable means is provided in trunk circuit 29 further to complete the call through incoming selector **29*a* and connector 26** to the called subscriber C.

*Detailed description*

Figure 6:
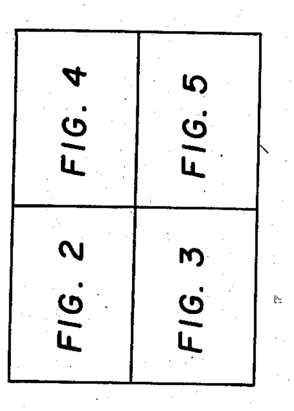
Fig. 6 shows the manner in which Figs. 2–5 should be arranged to provide a complete and understandable circuit.

This detailed description relates to the trunk circuit shown generally by the heavily inked rectangle 29 in Fig. 1 and shown specifically in Figs. 2–5 when joined in the manner shown in Fig. 6. This invention relates to switching means which may be operated to either of two positions. Each of these positions may be used for completing independent circuit functions. Therefore, the switching means may be reused at different times throughout the sequence of events leading to the completion of the call. At one time the switching means is operated to one of its two positions and at another time the switching means is operated to the other of its two positions. For example, I have shown two-step relays which close their X or preliminary contacts on one step and all of their contacts on the other step. For convenience only, I have designated the first step as that on which only the X contacts are closed and the second step as that on which all contacts are closed.

It is thought that two-step relays are old and well-known in the art. In one form, such a two-step relay is provided with a plurality of contacts which are arranged to be operated by an armature that moves responsive to magnetic forces produced in a core or winding responsive to electrical currents. The contacts may be arranged to operate at different times or points in the excursion of the armature as it moves from its normal position. By limiting the current, it is possible to limit the armature travel so that certain contacts are operated but others are not. The current may be limited or otherwise controlled by means of a resistor which may be either included in or excluded from a circuit, or the current may be limited by the physical characteristics and construction of a two-step relay's winding. The foregoing examples of suitable forms of two-step relays were cited by way of illustration and should not be construed as limiting the invention.

As will be pointed out hereinafter, supervisory relay 210 is a two-step relay, as indicated by the symbol 2S, which operates to its first step to control the return of answer supervision incident to an incoming call but which operates to its second step to perform all supervision functions incident to the answering of an outgoing call. Coin tone relay 320 also is a two-step relay which operates on outgoing calls to its second step to control the transmission of paystation tone if the call is from a paystation subscriber but which operates to its first step to complete answer supervision on incoming calls. Paystation tone is extended during the discharge time of capacitor C35 and may be repeated at an operator's option.

*Outgoing call from non-reverse battery supervision selector*

The first call to be described is an outgoing call from subscriber B to office 30. In this case, subscriber B initiates the call by removing his telephone handset. Responsive thereto, line circuit 23 causes allotter 27 to operate finder 24 to find and to connect with the calling line. Then, selector 25 is operated responsive to the receipt of digit pulses to seize the level including contacts 25*b*.

*Seizure of trunk circuit 29.*—Means is provided in trunk circuit 29 to complete a loop across conductors T1 and R1 responsive to seizure for operating calling bridge relay 230. The purpose of this relay is to respond to a seizure signal for taking the trunk circuit into operation and to furnish talking battery to the calling subscriber telephone station. The circuit for operating calling bridge relay 230 may be traced from ground (+) through the upper winding of relay 230, rest contacts 421, the upper lefthand winding of repeat coil RC–41, tip conductors T and T1, selector 25, the calling subscriber station, through a loop completed thereat and return over ring conductors R1 and R, the lower lefthand winding of repeat coil RC–41, contacts 423, and the lower winding of calling bridge relay 230 to (−) battery. Relay 230 operates in this circuit. Contacts 231 close to return ring back tone to the calling subscriber station as an indication that the operator at the distant end is being signaled. The circuit for ring back tone may be traced from a ring back tone conductor through capacitor C21, operated contacts 231, rest contacts 411 and 215, and conductor R1 to the calling subscriber. Contacts 232 close to prepare a circuit for signaling over conductor M. Contacts 331 open to remove the idle line termination normally connected from conductor T, over conductor T4, contacts 521*a*, capacitor C36, resistor R36, contacts 311, 331, conductor R4 and conductor R. Contacts 333 close to light monitor lamp MON brilliantly as an indication that the trunk circuit has been seized but the call has not been answered as yet. The circuit for this feature may be traced from ground (+) through the filament of monitor lamp MON, resting contacts 527, operated contacts 333, rest contacts 317 and over the message supervisory conductor to (−) battery (not shown).

Contacts 332 close to operate release delay relay 340 over an obvious circuit. The purpose of this relay is to mark the circuit busy to all other points of access and to hold the trunk circuit in an operated condition. Contacts 345 open to remove a ground (+) marking formerly extended to the all-trunks-busy conductor. This conductor is a traffic surveying device and serves to register the number of times or the total duration of time that all trunks in a given group of trunks are busy. The ground (+) marking formerly extended to this conductor may be traced from the all-trunks-busy conductor through rest contacts 345, 414, 425 and busy key contacts BK–21 to ground (+). Contacts 342 close to prepare a circuit for operating shunt relay 510. Contacts 246 close and 245 open to switch conductor E from its normal connection with pulse relay 430 to a connection through the upper winding of supervisory relay 210. Incidentally, relay 210 is adapted to operate to its second step when energized over its upper winding and to its first step when energized over its lower winding. Contacts 244 close to mark trunk circuit 29 busy to all other equipment from which it might be seized. The circuit for extending this busy marking may be traced from ground (+) on contacts 217, and alternatively from contacts 225, over operated contacts 244, busy key contacts BK–22 and sleeve conductors S1, S2 and S3. Contacts 243 close to extend a seizure signal to the distant office. This signal may be traced from (−) battery through the filament of lamp L41, operated contacts 232, 243, conductor M, the upper winding of relay 440, impedance I41 and conductor R5 to the distant office. Contacts 241 have no function in the call being described but relate to alarm sending, which will be described later.

Coin tone relay 320 operates when contacts 344 and 343 close. This is a two-step relay which is operated to its second step when energized in series with resistor R31. The function of relay 320 in this call is to start the common interrupter and to apply coin tone at a later time, if necessary. The circuit for operating this relay may be traced from (−) battery through the winding of relay 320, operated contacts 344, resistor R31, operated contacts 343, rest contacts 313 and 523 to ground (+). Contacts 324 have no function at this time. Contacts 323 close to apply a ground (+) potential to the start conductor thereby initiating the operation of common apparatus designed to furnish certain tones and other timed pulses. Contacts 322 open to break a circuit which is not necessary in this call. Contacts 221 and 222 close to prepare a tone circuit if it is required to identify a paystation telephone.

The trunk circuit has been seized, the calling subscriber has received ring back tone and a seizure signal has been sent to the distant office. Nothing further happens until the call is answered in the distant office.

*Answer supervision.*—When the operator answers the call, a circuit is completed over conductor R5 to operate signal relay 440. This circuit may be traced from conductor R5 through impedance I41, the upper winding of relay 440, conductor M, operated contacts 243, 232 and the filament of lamp L41 to (−) battery. Signal relay 440 operates to close its contacts 441 thereby energizing supervisory relay 210 over its upper winding.

Relay 210 is arranged to operate to its second step when energized over its upper winding. Therefore, all contacts associated therewith are operated at this time. Contacts 215 open to terminate the transmission of ring back tone to the calling subscriber. Contacts 218 open and 219 close to replace the ground (+) normally extended through resistor R25 with (−) battery extended through resistor R26 to conductors HS2 and HS1. This change of potential is used during certain calls to mark special features. These markings have nothing to do with the present invention but relate to preceding circuits. Contacts 311 open further to break the idle line termination path normally connected across conductors T and R via conductor T4, contacts 521*a*, 311, 331 and conductor R4. Contacts 312 close to prepare a path to shunt relay 510; however, it does not operate at this time since contacts 321 are now open. Contacts 315 have no effect during this call. Contacts 314 close to provide a release control feature. Contacts 317 open and contacts 318 close to cause lamp MON to glow dimly as an indication that a call through the trunk circuit has been answered. Previously the lamp had glowed brightly over the following circuit: ground (+), the filament of lamp MON, contacts 527, 333, 317 and the message supervisory conductor to (−) battery, not shown. Now it glows dimly over a circuit extending from ground (+) via the filament of lamp MON, contacts 527, 333, 318, resistor R34 to (−) battery (not shown) connected to the message supervisory conductor.

*Coin tone.*—Contacts 313 open thereby breaking the circuit to coin tone relay 320. The circuit for operating this relay formerly extended from (−) battery through the winding of relay 320, operated contacts 344, resistor R31, operated contacts 343, rest contacts 313 (now open) to ground (+) through contacts 523. However, relay 320 does not release immediately due to the charge on capacitor C35. It begins to discharge through resistors R35, R31 and operated contacts 344 to hold coin tone relay 320 operated for a brief interval of time. It should be noted that both supervisory relay 210 and coin tone relay 320 are operated during this brief interval.

Figure 2:
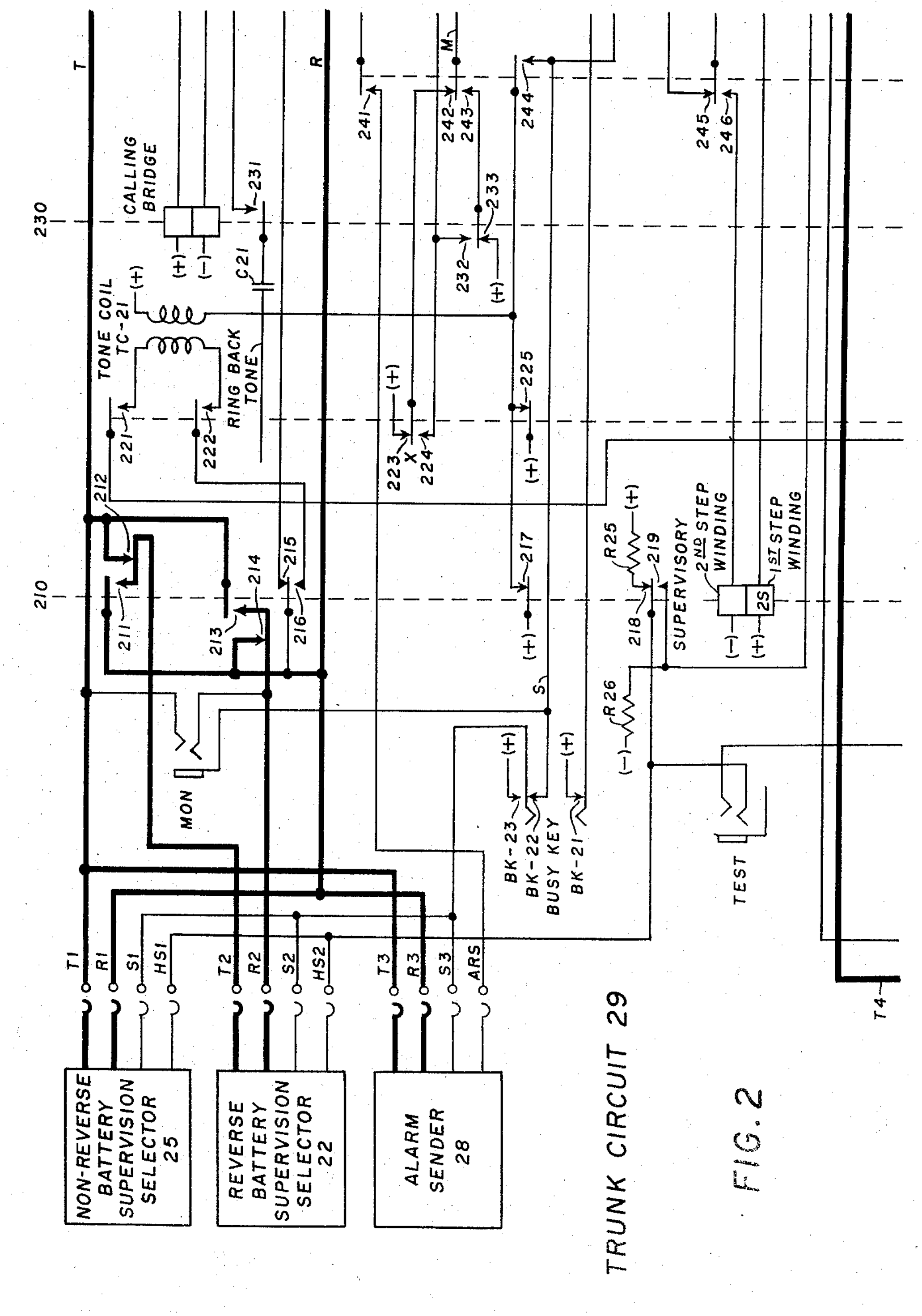
Figs. 2–5 show details of trunk circuit 29.
Figure 3:
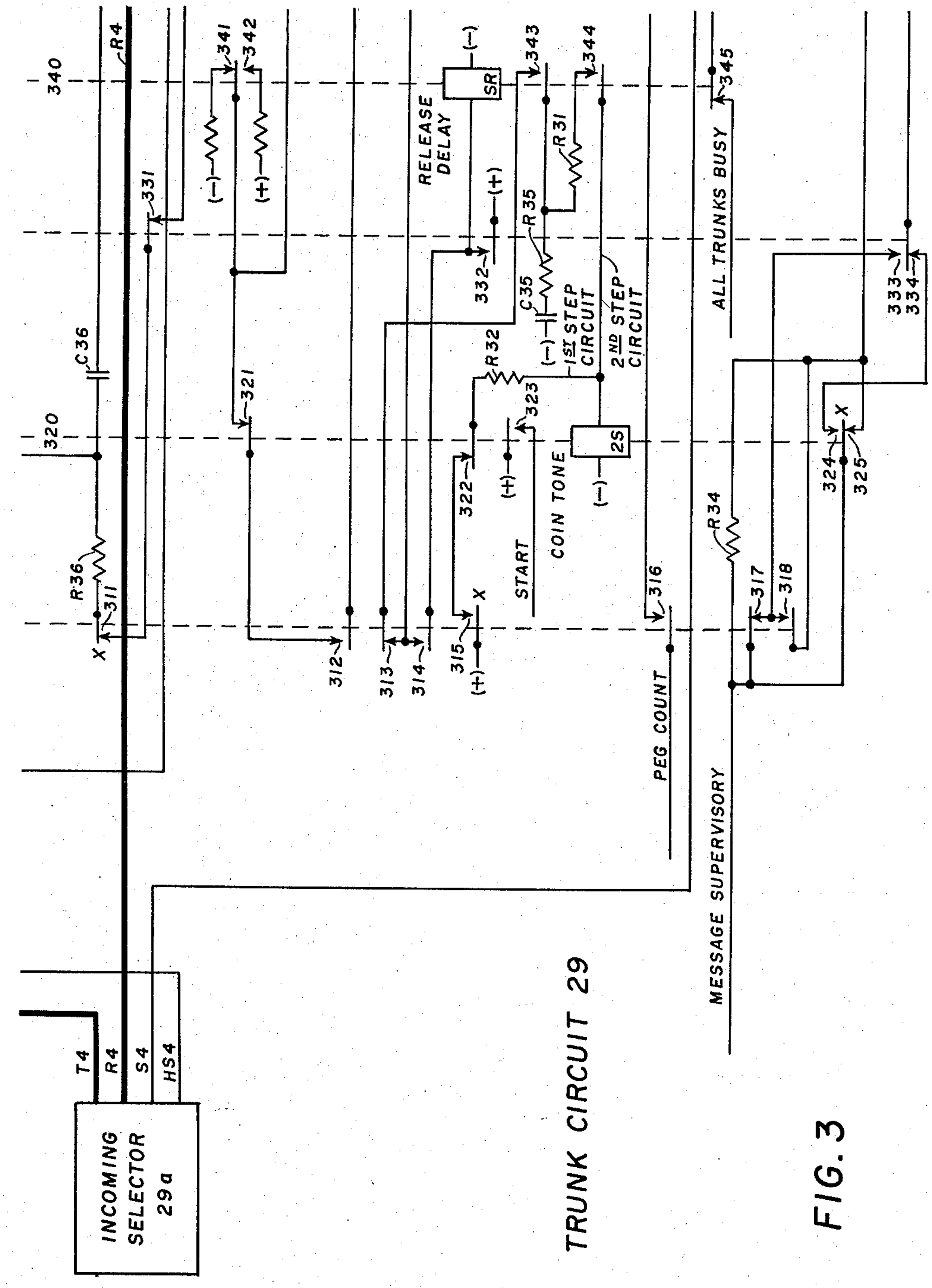
Figure 4:
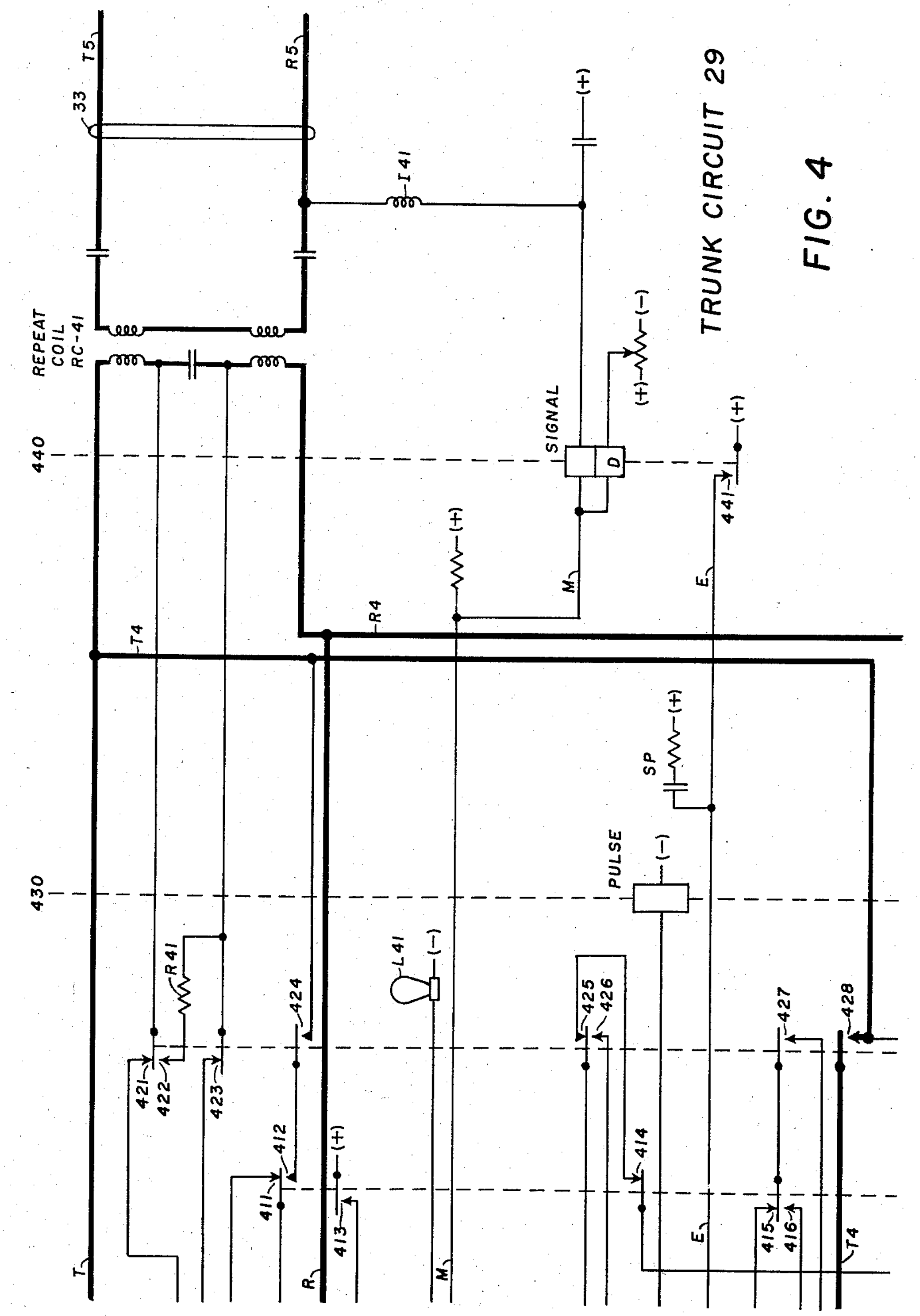

If the call is from a paystation telephone, a coin box tone is applied to the sleeve conductor in the line circuit of that telephone by means of apparatus not shown. For example, if subscriber B in Fig. 1 is a paystation telephone, apparatus in line circuit 23 applies a paystation tone to contacts PS. This tone is extended through finder 24, selector 25 and brush 25*a* which is now in contact with terminal 25*b*, to two-way trunk circuit 29. This paystation tone appears on sleeve S1 (Fig. 2). Assuming for the moment that subscriber B is a paystation telephone and that the tone is on sleeve S1, a circuit is completed for applying this tone to conductors T5 and R5 as an indication to the operator at the distant exchange that the call requires coin supervision. The circuit for applying this tone may be traced from sleeve S1, over busy key contacts BK–22, operated contacts 244, and the righthand winding of tone coil TC–21 to ground (+). Supervisory relay 210 has opened its contacts 217 and coin tone relay 320 is holding contacts 225 open to avoid shunting this tone to a direct ground. If the tone is present, it is induced in the secondary winding of tone coil TC–21 and is applied over a circuit which may be traced from (−) battery through the lower winding of relay 230, rest contacts 423, the lower lefthand winding of repeat coil RC–41, ring conductor R, operated contacts 216, 222, the lefthand winding of tone coil TC–21, operated contacts 221, capacitor C36, rest contacts 521*a*, tip conductors T4 and T, the upper lefthand winding of repeat coil RC–41, rest contacts 421 and the upper winding of calling bridge relay 230 to ground (+).

If paystation tone is not superimposed upon sleeve S1, no tone is applied to the line at this time; however, the preceding circuit is held from ground (+) applied through the righthand winding of tone coil TC–21 to sleeve S1.

After capacitor C35 has fully discharged through resistors R35, R31, contacts 344 and the winding of coin tone relay 320 to (−) battery, relay 320 releases thereby closing contacts 322. At this time a circuit is completed from ground (+) through contacts 315, 322, resistor R32 and the winding of coin tone relay 320 to (−) battery. This circuit provides current which is enough to operate coin tone relay 320 to its first step where only the preliminary or "X" contacts are operated. The coin tone relay does not operate to its second step since that circuit is now open at contacts 313. The net effect is that contacts 221 and 222 are opened to remove coin tone. Contacts 224 and 324 are closed but they perform no useful function at this time. Contacts 225 remain closed to apply an alternative ground to sleeve conductors S1, S2 and S3 for maintaining trunk circuit 29 busy to all other equipment. Contacts 322 remain closed so that coin tone relay 320 remains on its first step.

Shunt relay 510 operates over a circuit which may be traced from (−) battery through the winding of relay 510, operated contacts 312, rest contacts 321 and operated contacts 342 to ground (+). This relay locks at its contacts 511.

If the operator wishes to reapply coin tone, she disconnects momentarily to release relay 210. Relay 320 reoperates when contacts 313 close. When the operator reconnects, coin tone is returned once more in the manner explained above. Ring back tone is not returned to the calling subscriber when contacts 215 close because shunt relay 510 is now holding this circuit open at contacts 411.

The call is extended to operator position 31 (Fig. 1) in office 30. She completes a call in any desired manner and conversation follows.

*Release.*—After the call is completed the circuit is released when both parties hang up. Responsive to on-hook supervision, the loop across conductors T1 and R1 is broken thus releasing calling bridge relay 230. Contacts 332 open but release delay relay 340 does not restore because it is held over the following circuit: (−) battery, the winding of relay 340, contacts 314 and 523 to ground (+). Conductor M is marked by ground (+) as a release signal to the distant office. This circuit may be traced from ground (+) applied through contacts 233, 243, conductor M, the upper winding of relay 440, impedance I41 and ring conductor R5. Busy ground continues to guard trunk circuit 29 until operator 31 disconnects. This busy marking circuit includes contacts 225, 244, busy key contacts BK–22 and the sleeve conductors. When the operator does release, signal relay 440 releases to open contacts 441. Responsive thereto, relay 210 releases, opens contacts 314 and restores release delay relay 340. Pulse relay 430 is reconnected to conductor E at contacts 245 in preparation for the next incoming call. Idle line termination is reconnected across conductors T and R to maintain a balanced repeat coil and trunk line. This idle line termination may be traced from ground (+) through the upper winding of relay 230, rest contacts 421, the upper lefthand winding of repeat coil RC–41, tip conductor T4, rest contacts 521*a*, capacitor C36, resistor R36, rest contacts 311, 331, ring conductor R4, the lower lefthand winding of repeat coil RC–41, rest contacts 423 and the lower winding of calling bridge relay 230 to (−) battery. Contacts 345 close to extend an idle ground marking to the all-trunks-busy conductor. This marking may be traced from the all-trunks-busy conductor over contacts 345, 414, 425 and busy key contacts BK–21 to ground (+).

*Outgoing call from reverse battery supervision selector*

The next call to be described is an outgoing call from reverse battery supervision selector 22. Referring to Fig. 1, it is seen that a call of this type is extended from distant office 10 through office 20, including trunk circuit 29, in tandem to office 30. The call is initiated and answered in the manner described above in connection with the call from non-reverse battery supervision selector 25. The primary difference between the two calls is that when supervisory relay 210 operates responsive to ground applied to conductor E on answer supervision controlled from the distant end, contacts 211—214 operate to reverse the direction of current flow over conductors T2 and R2, thus returning answer supervision to office 10. More particularly, before the call is answered the direction of current flow may be traced from (−) battery through the lower winding of calling bridge relay 230, rest contacts 423, the lower lefthand winding of repeat coil RC–41, rest contacts 214, conductor R2 through reverse battery supervision selector 22 and a completed loop to conductor T2, rest contacts 212, the upper lefthand winding of repeat coil RC–41, rest contacts 421 and through the upper winding of calling bridge relay 230 to ground (+). After operation of supervisory relay 210, in the manner described above in the section entitled "Answer Supervision," the direction of current flow may be traced from (−) battery through the lower winding of calling bridge relay 230, rest contacts 423, the lower lefthand winding of repeat coil RC–41, conductor R, operated contacts 211, conductor T2, reverse battery supervision selector 22 and return over conductor R2, operated contacts 213, conductor T, the upper lefthand winding of repeat coil RC–41, rest contacts 421 and the upper winding of relay 230 to ground (+).

It should be observed that the direction of current flow over conductors T2 and R2 has been reversed at contacts 211—214. Except for this distinction, this call is exactly the same as one described above which was extended through non-reverse battery supervision selector 25.

*Alarm sender*

The next call to be described is an outgoing call from the alarm sender. This device functions to seize an idle trunk circuit, such as trunk circuit 29, for example. Responsive thereto, the circuit operations are completed in exactly the same manner as described above. However, when shunt relay 510 operates a circuit is completed at contacts 413 to cause alarm sender 28 to operate to transmit a suitable number of tones or signals, as the case may be, to inform the operator at office 30 of any existing faults together with the nature thereof. The call is released in the manner explained above in the section entitled "Release."

*Incoming calls*

*Seizure.*—The next call to be described is one which is incoming to office 20 from office 30. Office 30 seizes the trunk circuit by means of two-way trunk line 33. A suitable signal is placed on conductor R5 (Fig. 4), leading to two-way trunk circuit 29, for operating relay 440. The circuit for operating this relay may be traced from (—) battery (not shown) over conductor R5, impedance I41, through the upper winding of signal relay 440, conductor M, and rest contacts 242, to ground (+) applied through rest contacts 223. Relay 440 operates and closes contacts 441 to extend a seizure signal over conductor E.

Figure 5:
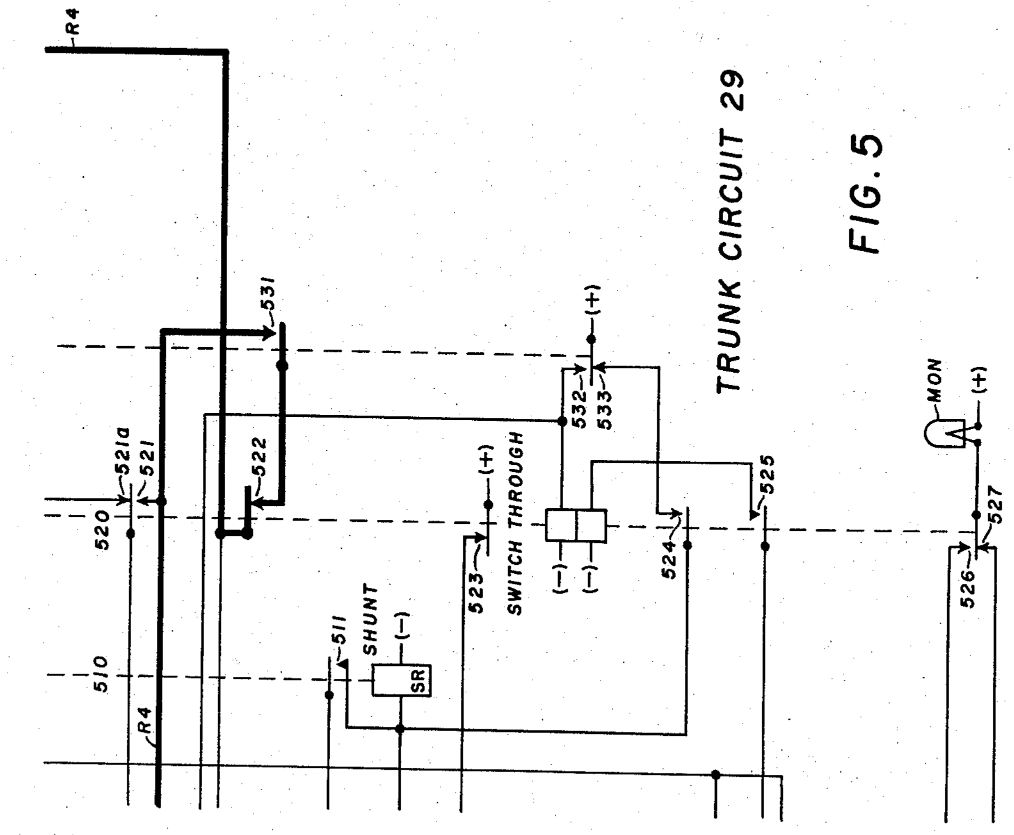

Pulse relay 430 operates over a circuit which may be traced from (—) battery through the winding of relay 430, rest contacts 245 and conductor E to ground (+) applied through operated contacts 441. The purpose of relay 430 is to seize trunk circuit 29 and to receive and repeat incoming digit pulses which may be transmitted by the operator at switchboard 31 to control incoming selector **29*a*. These digit pulses set selector 29*a* to seize an idle set of terminals leading to a desired connector, such as connector 26, for example. Succeeding digit pulse trains may be transmitted from operator position 31 to set connector 26 to seize and signal the telephone serving subscriber C. All of these digit pulses are repeated at contacts 531 (Fig. 5). Spark protection circuit SP is provided to protect contacts 441** against pitting.

In greater detail, the seizing signal ground applied to conductor E operates pulse relay 430. Contacts 531 close to prepare a loop to the incoming switch. Contacts 532 close to operate switchthrough relay 520 over an obvious circuit. This relay will lock at its contacts 525 to ground returned over conductor S4 after incoming selector **29*a* has been seized. A circuit is completed for seizing incoming selector 29*a* which may be traced from conductor T4, through operated contacts 428, the upper lefthand winding of repeat coil RC–41, operated contacts 422, resistor R41, the lower lefthand winding of repeat coil RC–41, conductor R4, operated contacts 522, 531 and conductor R4 to incoming selector 29*a*. Contacts 421 and 423 open to disconnect calling bridge relay 230 so that it may not be operated during this call. Contacts 424 close to complete part of the path which will be used during digit pulsing to shunt repeat coil RC–41. These contacts are necessary on outgoing calls since without them the calling bridge relay could not be restored properly upon release. The idle trunk marking is removed from the all-trunks-busy conductor at contacts 425. A busy marking is applied to sleeve conductors S1, S2 and S3 to prevent trunk circuit 29 from being seized by an outgoing call. This busy marking may be traced from ground (+) applied through busy key contacts BK–21, operated contacts 426, busy key contacts BK–22 to sleeve conductors S1, S2 and S3. Contacts 427 close to prepare a circuit from ground (+) through the lower winding of supervisory relay 210 via operated contacts 415, 427 and extra sleeve conductor HS4. Contacts 521*a* open to remove the idle line termination normally applied across conductors T4 and R4. Contacts 523 open to prevent a two-step operation of coin tone relay 320. Contacts 524 close to prepare shunt relay 510. Contacts 526 close to light monitor lamp MON brightly as an indication that an imcompleted call is extended to trunk circuit 29. The circuit for this operation may be traced from ground (+) through the filament of monitor lamp MON, operated contacts 526, rest contacts 325** and the message supervisory conductor to (—) battery (not shown).

After incoming selector **29*a* has been seized, a marking is returned over conductor S4 and contacts 525 to lock switchthrough relay 520**.

The circuit is ready for the receipt of digit pulses; therefore, nothing further happens until the operator at switchboard 31 transmits a suitable number of digit pulse trains to set incoming selector **29*a*** and succeeding switches for seizing a called subscriber line.

*Digit pulsing.*—Each pulse that is received is repeated by relay 440 in the form of ground pulses extended over conductor E. That is, normally, at this time in the call, conductor R5 is marked by a resistance battery which is extended from the distant office. For example, if the digit "5" were to be transmitted at this time, conductor R5 would be switched from (—) battery to ground (+) five times for each of the five digit pulses. At the end of the digit pulse train, conductor R5 remains connected to (—) battery. Responsive to each ground pulse that is received, signal relay 440 releases to open contacts 441. Responsive to each return to (—) battery following a digit pulse, signal relay 440 reoperates to close contacts 441. Pulse relay 430 follows these pulses by opening and closing its contacts 531—533. Responsive to the first time that contacts 533 close, a circuit is completed for operating shunt relay 510. This circuit may be traced from ground (+) through contacts 533, 524 and the winding of shunt relay 510 to (—) battery. Switchthrough relay 520 does not release when contacts 532 open because it is locked from sleeve ground applied by selector **29*a* to conductor S4 through contacts 525 and the lower winding of relay 520** to (—) battery.

Shunt relay 510 operates to complete a short circuit across the repeat coil at contacts 412 thereby improving pulsing characteristics. The pulsing path includes this short circuit and may be traced from selector **29*a*, over conductor T4, operated contacts 428, 424, 412, rest contacts 215, conductor R, conductor R4, operated contacts 522, 531 and ring conductor R4 to incoming selector 29*a*. Each time that pulse relay 430 is released responsive to the receipt of an incoming digit pulse, contacts 531 open to repeat a digit pulse to incoming selector 29*a*. Incoming selector 29*a* responds by any suitable means and it is directed to seize connector 26** (Fig. 1), for example.

*Answer supervision.*—Following this, a called subscriber is signaled in any conventional manner. He answers by removing his handset responsive to which incoming selector **29*a* applies a (—) battery marking to extra sleeve conductor HS4. This marking is extended through operated contacts 427, rest contacts 415 and the lower winding of supervisory relay 210 to ground (+). The values in this circuit are sufficient to operate supervisory relay 210 to its first step only. This relay is arranged to operate its "X" or preliminary contacts on its first step without operating any other of its contacts. Contacts 311 open further to break the idle line termination. Contacts 315 close to extend a reduced current through coin tone relay 320 over the circuit from ground (+) through contacts 315, 322, resistor R32 and the winding of coin tone relay 320** to (—) battery. The degree to which the current is reduced depends upon the value chosen for resistor R32.

Coin tone relay 320 is arranged to operate to only its first step responsive to this reduced energizing circuit. On this step, it operates its "X" or preliminary contacts while leaving the other contacts unoperated. When contacts 325 open, a circuit is completed for causing monitor lamp MON to glow dimly as an indication that the call has been switched through. The circuit for causing this function may be traced from ground (+) through the filament of monitor lamp MON, operated contacts 526, resistor R34 and the message supervisory conductor to a (−) battery (not shown). The lamp glows dimly due to the inclusion of resistor R34. Answer supervision is returned to the distant office when contacts 223 open to remove the ground (+) normally applied to conductor M through contacts 223 and to substitute therefor a (−) battery marking which may be traced from (−) battery through the filament of lamp L41, operated contacts 224, rest contacts 242, conductor M, the upper winding of signal relay 440 and impedance I41 to conductor R5.

*Release.*—Following the termination of conversation, the called subscriber may hang up first, in which case the (−) battery marking is removed from conductor HS4 so that supervisory relay 210 is released. Formerly, this relay was operated over the circuit which may be traced from ground (+) through the lower winding of relay 210, rest contacts 415, operated contacts 427 and conductor HS4 to incoming selector 29*a*. Contacts 315 open responsive thereto and coin tone relay 320 is released. Contacts 223 close to reapply a ground (+) marking to conductor M through contacts 223 and 242. The operator at the distant office responds by releasing the call. Responsive thereto, signal relay 440 releases to open contacts 441 thereby restoring pulse relay 430. Contacts 532 open to release switchthrough relay 520, assuming that the calling subscriber has hung-up. If he has not, switchthrough relay 520 will release when he does hang up and when incoming selector 29*a* removes the ground (+) marking from conductor S4.

Following this, the circuit is returned to normal and ready for the next call.

*Miscellaneous*

Several features have been shown but have not been explained previously since they do not relate directly to the invention. For example, the peg count conductor is connected with a meter (not shown) which is effective for determining the number of times that the trunk circuit is operated. For example, each time that supervisory relay 210 operates, contacts 316 close to extend a marking via contacts 414, 425 and busy key contacts BK–21 to operate the peg count meter. The busy key is provided to prevent the trunk circuit from being seized during periods when it is being serviced. This artificially marks the trunk circuit as busy by applying ground to conductors S1—S3 at contacts BK–23. The test and monitor jacks are for the benefit for maintenance personnel.

While I have shown and described only a single embodiment of my invention, it should be obvious that various changes may be made without departing from the scope of my invention. Therefore, I intend to include within the scope of the attached claims not only the particular invention shown but also all modifications which may fall within the true scope of my invention.

What is claimed is:

1. A two-way trunk circuit comprising first and second two position switching means, means for operating said first two position switching means to one of its positions for performing supervision functions incident to the answering of an outgoing call extended through said trunk circuit, means for operating said second two position switching means to one of its positions on outgoing calls extended through said trunk circuit for controlling the transmission of pay station tone, means for operating said first two position switching means to the other of its positions responsive to the answer of an incoming call extended through said trunk circuit, and means responsive to operation of said first two position switching means to said other position for operating said second means to the other of its positions for completing answer supervision on incoming calls.

2. The trunk circuit of claim 1, and means for controlling said second two position means on its said one position for transmitting a pulse of paystation tone for a timed interval and means for repeating said timed pulse of paystation tone at an operator's option.

3. The trunk circuit of claim 2 wherein said means for controlling said second means comprises a capacitor and said means for repeating said pulse comprises means for recharging said capacitor.

4. In a telephone system comprising a trunk line, a two-way trunk circuit terminating said trunk line, automatic switch means for extending incoming and outgoing calls to and from said trunk circuit, first means effective during said incoming calls for returning answer supervision over said trunk line, means effective during said incoming calls and responsive to said first means for giving local supervision to indicate when said trunk circuit has been seized and when said call has been extended through said trunk circuit, means effective during said outgoing calls and responsive to said first means for identifying calls which originate at paystations, second means for returning supervision to said switch means on said outgoing calls, and means effective during said incoming calls and responsive to said second means for controlling the operation of said first means.

5. The telephone system of claim 4 wherein said means for identifying calls which originate in paystations comprises means for transmitting paystation tone during a brief interval, and means for repeating said transmission of said paystation tone for another brief interval at an operator's option.

6. The telephone system of claim 5 wherein said trunk line comprises a dial leg, and said first means comprises a first two position switching means together with means responsive to operation of said two position switching means to one of its said positions for returning said answer supervision over said dial leg.

7. The telephone system of claim 6 wherein said means for identifying said paystation comprises means responsive to operation of said two position switching means to the other of its said positions for transmitting a paystation tone for a predetermined interval of time.

8. The telephone system of claim 7 and a timing means for measuring said predetermined interval of time, means responsive to said timing means for holding said two-position switching means operated to its said other position during said predetermined interval while said paystation tone is being transmitted.

9. The telephone system of claim 8 wherein said timing means comprises a capacitor together with circuit means for connecting said capacitor to discharge through said two-position switching means for maintaining it operated to said other position, said means for repeating said tone comprises means responsive to operator control over said trunk line for reoperating said two-position switching means and recharging said capacitor, whereby said paystation tone may be repeated at said operator's option, and means for holding said trunk circuit in a call condition while said paystation tone is being repeated.

10. The telephone system of claim 9 wherein said second means comprises another two-position switching means together with means for operating said other two-position switching means to one of its said positions for returning said supervision to said automatic switch means, and means responsive to the extension of a call through said trunk circuit to an incoming selector for causing said other two-position switching means to operate to the other of its said positions to control said first two-position switching means.

11. The telephone system of claim 4 wherein said second means comprises a two-position switching means together with means for operating said two-position means to one of its said positions for returning said supervision to said automatic switch means, and means responsive to the extension of a call through said trunk circuit to an incoming selector for causing said two-position switch means to operate to the other of its positions to control said first means.

12. A trunk circuit having two points of access, a trunk line, means for extending outgoing calls through either of said points of access and said trunk circuit to said trunk line, means for returning ring back tone to a calling point through one of said points of access for indicating that said call has been extended to said trunk line, first means responsive to answer of said call at the distant end of said trunk line for terminating said ring back tone and for extending answer supervision through only one of said points of access without returning any answer supervision through the other of said points of access, control means for momentarily transmitting a pulse of paystation tone through said trunk circuit to said trunk line if said call originated at a paystation, operator controlled means for repeating said transmission of said pulse of paystation tone, means for extending incoming calls from said trunk line through said trunk circuit, means responsive to said incoming calls for operating said control means to return answer supervision over said trunk line, means responsive to operation of said first means for controlling said control means, and means also responsive to operation of control means for giving local bright-dim supervision for indicating when said call has been extended to and when said call has been switched through said trunk circuit.

13. The trunk circuit of claim 12 wherein said means for repeating transmission of said paystation tone comprises operator controlled means for disconnecting and reconnecting without releasing said trunk circuit and preceding equipment.

14. The trunk circuit of claim 13 and means for preventing the transmission of ring back tone during said disconnection and reconnection operation.

References Cited in the file of this patent

UNITED STATES PATENTS

| | | |
|---|---|---|
| 2,669,606 | Kessler | Feb. 16, 1954 |
| 2,672,513 | Lomax | Mar. 16, 1954 |
| 2,700,069 | Pharis et al. | Jan. 18, 1955 |